United States Patent
Lee et al.

(10) Patent No.: US 9,857,878 B2
(45) Date of Patent: Jan. 2, 2018

(54) METHOD AND APPARATUS FOR PROCESSING GESTURE INPUT BASED ON ELLIPTICAL ARC AND ROTATION DIRECTION THAT CORRESPONDS TO GESTURE INPUT

(71) Applicant: SAMSUNG ELECTRONICS CO., LTD., Suwon-si (KR)

(72) Inventors: Kyoobin Lee, Seoul (KR); Keun Joo Park, Seoul (KR); Eric Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 14/718,259

(22) Filed: May 21, 2015

(65) Prior Publication Data

US 2016/0187990 A1     Jun. 30, 2016

(30) Foreign Application Priority Data

Dec. 26, 2014   (KR) .................. 10-2014-0191031

(51) Int. Cl.
*G06F 3/042*  (2006.01)
*G06F 3/01*  (2006.01)
*G06F 3/00*  (2006.01)

(52) U.S. Cl.
CPC .............. *G06F 3/017* (2013.01); *G06F 3/005* (2013.01)

(58) Field of Classification Search
CPC .......... G06F 1/1694; G06F 3/017; G06F 3/005
USPC ........................................ 345/175; 178/18.09
See application file for complete search history.

(56) References Cited

U.S. PATENT DOCUMENTS

| | | | |
|---|---|---|---|
| 8,294,105 B2 | 10/2012 | Alameh et al. | |
| 2001/0042245 A1* | 11/2001 | Iwamura | G06F 3/005 348/E5.103 |
| 2003/0138130 A1* | 7/2003 | Cohen | G06F 3/017 382/103 |
| 2007/0124702 A1* | 5/2007 | Morisaki | G06F 3/017 715/863 |
| 2009/0103780 A1 | 4/2009 | Nishihara et al. | |
| 2010/0027845 A1* | 2/2010 | Kim | G06K 9/6296 382/107 |
| 2010/0050134 A1* | 2/2010 | Clarkson | G06F 3/017 715/863 |
| 2011/0310007 A1* | 12/2011 | Margolis | G06F 3/017 345/157 |
| 2013/0141326 A1* | 6/2013 | Liou | G06F 3/017 345/156 |
| 2013/0162520 A1* | 6/2013 | Kettle | G06F 3/017 345/156 |

(Continued)

FOREIGN PATENT DOCUMENTS

JP      2010049469 A     3/2010
JP      2012221072 A     11/2012
(Continued)

*Primary Examiner* — Adam J Snyder
(74) *Attorney, Agent, or Firm* — Sughrue Mion, PLLC

(57) ABSTRACT

A method and apparatus for processing a gesture input are provided. The method includes determining a type of an elliptical arc corresponding to a gesture input; determining a rotation direction corresponding to the gesture input; and processing the gesture input based on the type of the elliptical arc and the rotation direction.

23 Claims, 18 Drawing Sheets

(56) References Cited

U.S. PATENT DOCUMENTS

| | | | | |
|---|---|---|---|---|
| 2013/0169786 A1* | 7/2013 | Yang | ................... | G06F 3/017 |
| | | | | 348/77 |
| 2014/0118244 A1* | 5/2014 | Kaplan | ............... | G06F 3/0304 |
| | | | | 345/156 |
| 2014/0340311 A1* | 11/2014 | Holz | ................... | G06F 3/017 |
| | | | | 345/158 |
| 2015/0029092 A1* | 1/2015 | Holz | ................... | G06F 3/017 |
| | | | | 345/156 |

FOREIGN PATENT DOCUMENTS

| | | | |
|---|---|---|---|
| JP | 2013232119 A | 11/2013 |
| JP | 5461735 B2 | 4/2014 |
| KR | 1020130124061 A | 11/2013 |
| WO | 2011013400 A1 | 2/2011 |

* cited by examiner

FIG. 3

| Gesture input | Type of elliptical arc | | Rotation direction |
|---|---|---|---|
| | Direction of long axis | Relative position based on long axis | |
| ↷ | Horizontal | Up | Clockwise |
| ↶ | Horizontal | Down | Clockwise |
| ↶ | Horizontal | Up | Counterclockwise |
| ↷ | Horizontal | Down | Counterclockwise |

FIG. 4

| Gesture input | | | | |
|---|---|---|---|---|
| Type of elliptical arc | Direction of long axis | Vertical | Vertical | Vertical | Vertical |
| | Relative position based on long axis | Left | Right | Left | Right |
| Rotation direction | | Clockwise | Clockwise | Counterclockwise | Counterclockwise |

FIG. 5

| Type of elliptical arc | Correspondence action | Performing of action |
|---|---|---|
| | Swipe right action | O |
| | Swipe right action | X |
| | Swipe left action | O |
| | Swipe left action | X |
| | Swipe up action | O |
| | Swipe up action | X |
| | Swipe down action | O |
| | Swipe down action | X |

METHOD AND APPARATUS FOR PROCESSING GESTURE INPUT BASED ON ELLIPTICAL ARC AND ROTATION DIRECTION THAT CORRESPONDS TO GESTURE INPUT

CROSS-REFERENCE TO RELATED APPLICATION

This application claims priority from Korean Patent Application No. 10-2014-0191031, filed on Dec. 26, 2014 in the Korean Intellectual Property Office, the entire disclosure of which is incorporated herein by reference for all purposes.

BACKGROUND

1. Field

Methods and apparatuses consistent with exemplary embodiments relate to a method and apparatus for processing a gesture input.

2. Description of the Related Art

With the development in electronic technology, various types of electronic devices have been recently developed and distributed. Advanced technologies are applied to latest products so that users may further conveniently and effectively utilize such products. For example, the technologies may include a gesture recognition technology and a voice recognition technology.

The gesture recognition technology refers to a technology of sensing a motion of a user using a vision sensor and utilizing the sensing result. The gesture recognition technology may be conveniently utilized by a user. However, an unintended function may be performed in response to an inaccurately recognized gesture. In response to absence of a gesture input, the gesture input may be required iteratively a predetermined number of times.

In general, although a user may use his or her hand to input a gesture, a gesture capable of being represented with the hand is likely to be unclear. For example, a gesture of waving a hand, a gesture of moving a hand in one direction, and a gesture of swinging a hand to turn a page cannot be easily distinguished from one another.

Accordingly, there is a need for accurately recognizing an input gesture.

SUMMARY

According to an aspect of an exemplary embodiment, there is provided a method of processing a gesture input, the method including determining a type of an elliptical arc corresponding to a gesture input, determining a rotation direction corresponding to the gesture input, and processing the gesture input based on the type of the elliptical arc and the rotation direction. The gesture input may be a portion of an iterative elliptical motion input.

The gesture input may be a portion of an iterative elliptical motion input.

The gesture input may correspond to one of an intention delivery portion and a return portion of a circular motion input.

The type of the elliptical arc may include a direction of a long axis of an ellipse corresponding to the gesture input, and a relative position of the elliptical arc based on the long axis.

The method may further include receiving event signals output by pixels of an event based vision sensor that detects a change in light due to the gesture input, wherein at least one of the type of the elliptical arc and the rotation direction is determined based on the event signals.

The method may further include calculating determining an optical flow based on distance differences and time differences between elements of an event map that correspond to the event signals and peripheral elements of the elements, wherein at least one of the type of the elliptical arc and the rotation direction is determined based on the optical flow.

The method may further include receiving images output by a frame based vision sensor that captures the gesture input for each frame; and generating comparing the images to generate difference information between the images, wherein at least one of the type of the elliptical arc and the rotation direction is determined based on the difference information.

The determining the type of the elliptical arc may include matching the gesture input to one of ellipses; and matching the gesture input to one of elliptical arcs of the matched one of the ellipses.

The elliptical arcs may be mutually separate based on a long axis of the matched one of the ellipses.

The determining the type of the elliptical arc may include calculating determining an eccentricity of an ellipse corresponding to the gesture input; and calculating determining an angle indicating a position corresponding to the gesture input in a periphery of the ellipse.

The determining the rotation direction may include determining whether the gesture input is one of a clockwise direction and a counterclockwise direction.

The method may further include calculating determining at least one of a change in motion vectors over time and a change in position information over time corresponding to the gesture input, wherein at least one of the type of the elliptical arc and the rotation direction is determined based on one of the change in the motion vectors over time and the change in the position information over time.

The processing may include determining an input direction corresponding to the gesture input based on the type of the elliptical arc and the rotation direction; and performing an action corresponding to the input direction.

The processing may include determining whether the gesture input corresponds to one of an intention delivery portion and a return portion of a circular motion input based on the type of the elliptical arc and the rotation direction; performing an action corresponding to the circular motion input in response to the gesture input being determined to correspond to the intention delivery portion; and suspending the action in response to the gesture input being determined to correspond to the return portion.

The processing may include determining whether to perform an action corresponding to the gesture input based on a first angle indicating a position corresponding to a previous gesture input and a second angle indicating a position corresponding to the gesture input in a periphery of an ellipse corresponding to the previous gesture input and the gesture input.

The processing may include controlling a phase of an action corresponding to the gesture input based on an angle indicating a position corresponding to the gesture input in a periphery of an ellipse corresponding to the gesture input.

The method may further include determining whether the gesture input corresponds to an ellipse; and discarding the gesture input in response to the gesture input being determined not to correspond to the ellipse.

The gesture input may be input on a virtual plane in parallel with a vision sensor that detects the gesture input.

The processing may include processing the gesture input further based on at least one of a size of an ellipse corresponding to the gesture input, a velocity of the gesture input, and a depth of the gesture input.

According to an aspect of another exemplary embodiment there is provided a non-transitory computer-readable storage medium storing a program comprising instructions to cause a computer to implement the method.

According to an aspect of another exemplary embodiment, there is provided an apparatus for processing a gesture input, the apparatus including a sensor configured to detect a gesture input; a determiner configured to determine a figure corresponding to the gesture input, and a part corresponding to the gesture input among parts of the figure, based on figures having a rotation direction and a trajectory; and a decider configured to determine whether to perform an action corresponding to the figure based on the part corresponding to the gesture input.

The figure may correspond to a swipe action in a direction of a main axis of the figure.

The sensor may include an event based vision sensor configured to detect a change in light due to the gesture input; and a frame based vision sensor configured to capture the gesture input for each frame.

The determiner may be configured to determine a rotation direction corresponding to the gesture input, and determine the figure having the rotation direction among the figures having the rotation direction.

The decider may be configured to determine to perform the action in response to the part corresponding to an operation of performing the action, and determine not to perform the action in response to the part corresponding to a return operation to iteratively perform the action.

BRIEF DESCRIPTION OF THE DRAWINGS

The above and/or other aspects will become apparent and more readily appreciated from the following description of exemplary embodiments, taken in conjunction with the accompanying drawings in which:

FIGS. 3 and 4 illustrate types of an elliptical arc and rotation directions determined in response to a variety of gesture inputs according to exemplary embodiments;

FIG. 5 illustrates actions corresponding to a variety of gesture inputs and performing the actions according to exemplary embodiments;

DETAILED DESCRIPTION

Figure 1:
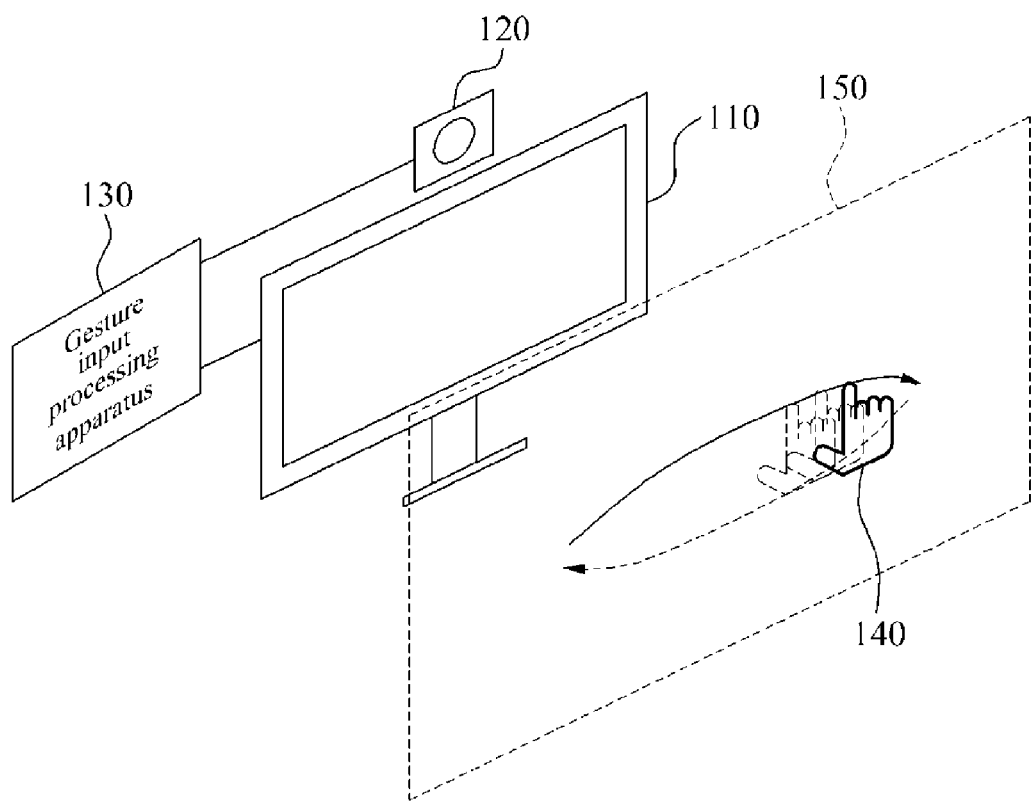
FIG. 1 is a view illustrating a system for processing a gesture input according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, exemplary embodiments will be described with reference to the accompanying drawings. Like reference numerals refer to like constituent elements throughout. The exemplary embodiments may be applicable to a user interface. For example, the exemplary embodiments may be applied to recognize a swipe motion in a non-contact motion recognition interface. According to the exemplary embodiments, iterative swipe motions may also be accurately and efficiently recognized.

FIG. 1 is a view illustrating a system 100 for processing a gesture input according an exemplary embodiment. The gesture input processing system 100 is a system that processes a gesture input of a user, and may be configured in various types, for example, a personal computer (PC), a laptop computer, a tablet computer, a smartphone, a television (TV), a smart electronic device, an intelligent vehicle, a kiosk, and a wearable device.

Referring to FIG. 1, the gesture input processing system 100 includes a display device 110, a sensor 120, and a gesture input processing apparatus 130. The display device 110 is a device that provides image information to a user, and may include, for example, a liquid crystal display (LCD) device, a light emitting display (LED) device, an organic LED (OLED) device, a light field display device, a beam projector display device, and a cathode ray tube (CRT) display device. The display device 110 may provide a two-dimensional (2D) image and/or a three-dimensional (3D) image to the user.

The sensor 120 is a device that detects an input object 140 in a non-contact manner, and may include, for example, a vision sensor. The input object 140 may be a portion of a body of the user, such as a hand and a finger, and may be an instrument, such as a stick and a ball. The sensor 120 transmits information about the detected input object 140 to the gesture input processing apparatus 130. For example, the sensor 120 may detect a movement of the input object 140, and may transmit information about the detected movement to the gesture input processing apparatus 130. The vision sensor will be further described with reference to FIG. 8.

The gesture input processing apparatus 130 is an apparatus that processes a gesture input of the user, and may be configured as a hardware module, a software module, or a combination of the hardware module and the software module. The gesture input processing apparatus 130 may be included in the gesture input processing system 100.

The gesture input of the user may be a non-contact input corresponding to a predetermined direction. For example, the user may move in a three-dimensional (3D) space while intending a predetermined direction such as a right direction, a left direction, an upward direction, and a downward direction. A gesture of the user may be input on a virtual plane 150 in parallel with the sensor 120.

The gesture input of the user may be a portion of a circular motion input capable of iteratively and continuously inputting an intention of the same direction. In the circular motion input, once an intention of the user is input once using the input object 140, the input object 140 needs to return to an original position for a subsequent input. For example, the user may move the input object 140 to a right point on the 3D space while intending the right direction. In this example, to continuously input an intention of the right direction, the user needs to return the input object 140 to a left point.

The gesture input processing system 100 may use a circular motion input in a predetermined shape to recognize an input direction corresponding to the gesture input. When a trajectory of the gesture input is partially known, the gesture input processing system 100 may utilize a predetermined circular motion input to predict an entire trajectory of the gesture input and predict a predetermined direction using the predicted entire trajectory. Alternatively, when the trajectory is partially known, the gesture input processing system 100 may utilize a predetermined circular motion input to immediately predict a predetermined direction.

In another example, the gesture input processing system 100 may also utilize a motion input in a predetermined elliptical shape. When a trajectory of an ellipse is partially known, the gesture input processing system 100 may predict an entire trajectory of the ellipse by calculating an eccentricity of the ellipse. The gesture input processing system 100 may predict an input direction corresponding to the gesture input based on a direction of a long axis of the predicted ellipse.

To iteratively and continuously recognize a gesture input intending the same direction, the gesture input processing system 100 may determine in advance an intention delivery portion and a return portion corresponding to a circular motion input in a predetermined shape. The intention delivery portion indicates a motion input of inputting an intention of the user using the input object 140 and the return portion indicates a motion input of returning the input object 140 to an original position for a subsequent input. For example, in response to a motion input in an elliptical shape having a long axis in a horizontal direction, the gesture input processing system 100 may determine an arc located above the long axis as the intention delivery portion, and may determine an arc located below the long axis as the return portion.

The gesture input processing system 100 may determine in advance the intention delivery portion and the return portion corresponding to the circular motion input by further considering a rotation direction of the circular motion input. For example, in response to an elliptical motion input having a long axis in a horizontal direction and rotating clockwise, the gesture input processing system 100 may determine an arc located above the long axis as the intention delivery portion, and may determine an arc located below the long axis as the return portion.

The exemplary embodiments may prevent a gesture input from being misrecognized in an opposite direction by utilizing a long elliptical motion instead of using a straight reciprocating motion when iteratively performing a circular motion input such as a swipe motion.

The gesture input processing apparatus 130 may recognize the gesture input of the user based on information received from the sensor 120. For example, the gesture input processing apparatus 130 may acquire the trajectory corresponding to the gesture input based on the information received from the sensor 120. The gesture input processing apparatus 130 may predict the entire trajectory based on the acquired trajectory, and may predict an input direction corresponding to the gesture input based on the predicted entire trajectory. In this example, the gesture input processing apparatus 130 may recognize that the gesture input of the user has been input while intending the predicted input direction.

The gesture input processing apparatus 130 may determine whether the gesture input corresponds to the intention delivery portion or the return portion. The gesture input processing apparatus 130 may perform an action corresponding to an input direction in response to the gesture input determined to correspond to the intention delivery portion. For example, the gesture input processing apparatus 130 may perform, on the display device 110, a swipe action corresponding to an input direction. The gesture input processing apparatus 130 may perform no action in response to the gesture input determined to correspond to the return portion.

The gesture input processing apparatus 130 may determine whether the gesture input corresponds to a predetermined shape, and may discard the gesture input instead of processing the gesture input in response to the gesture input determined not to correspond to the predetermined shape. For example, the gesture input processing apparatus 130 may determine that the gesture input is close to a circular shape rather than an elliptical shape. In this example, the gesture input processing apparatus 130 may not determine an input direction corresponding to the gesture input, and thus, may not process the gesture input.

According to exemplary embodiments, it is possible to enhance the recognition performance of a swipe motion in a non-contact motion recognition interface. For example, exemplary embodiments may provide a technology for enhancing a recognition rate of distinguishing a start point and an end point of a swipe motion and a recognition rate of an iterative swipe motion.

Figure 2:
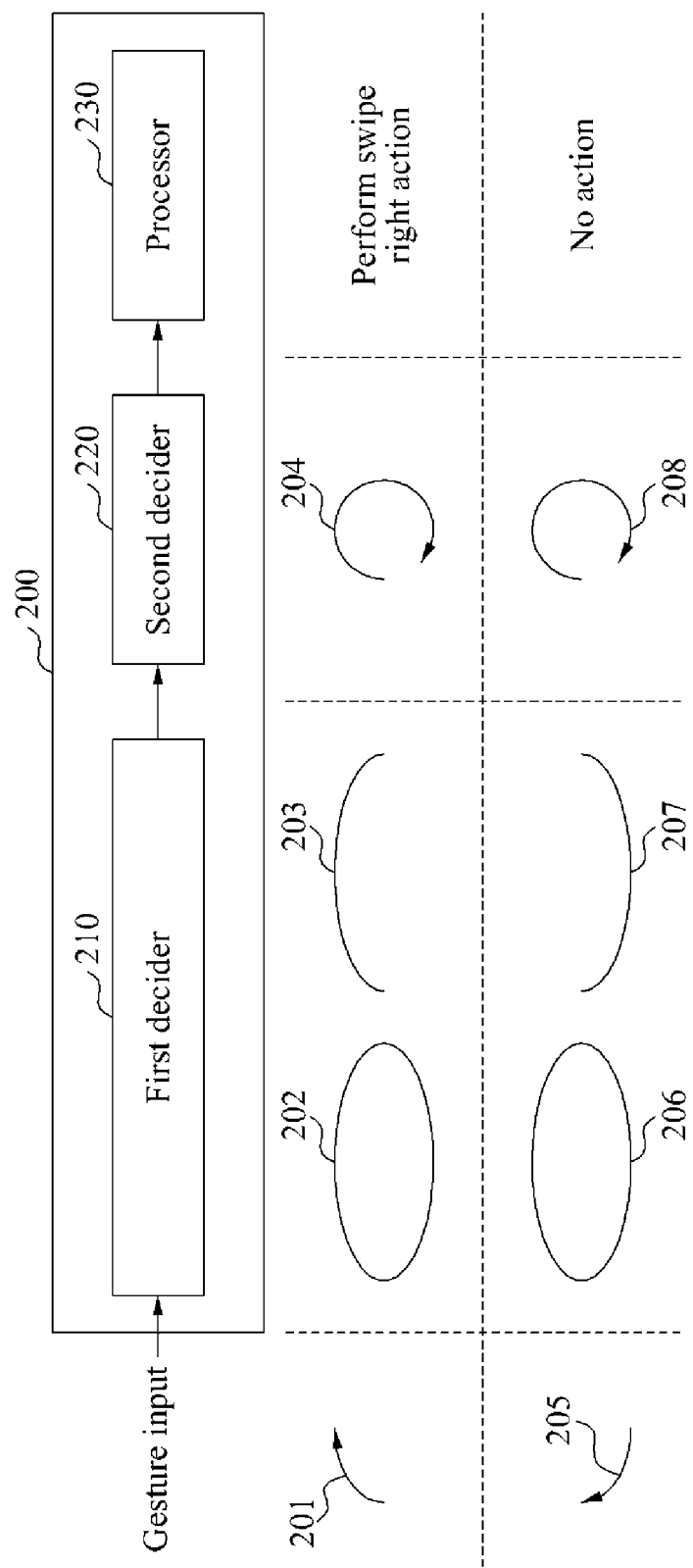
FIG. 2 is a view illustrating an operation of a gesture input processing apparatus according to an exemplary embodiment.

FIG. 2 is a view illustrating an operation of a gesture input processing apparatus 200 according to an exemplary embodiment. Referring to FIG. 2, the gesture input processing apparatus 200 includes a first decider 210, a second decider 220, and a processor 230. The first decider 210 receives a gesture input. The first decider 210 may receive an output signal of a sensor that detects the gesture input. The gesture input may be a portion of an iterative elliptical motion input. Here, the iterative elliptical motion input indicates a motion input in an elliptical shape capable of being iteratively input. The iterative elliptical motion input may correspond to a circular motion input in an elliptical shape.

The first decider 210 determines a type of an elliptical arc corresponding to the gesture input. The type of the elliptical arc may include a relative position of the elliptical arc based on a long axis of an ellipse corresponding to the gesture input. In this example, the first decider 210 predicts a trajectory of an ellipse 202 corresponding to a first gesture input 201 based on output information of a sensor about the first gesture input 201, and determines a direction of a long axis of the ellipse 202. The direction of the long axis of the ellipse 202 is determined to be a horizontal direction. Also, the first decider 210 determines an elliptical arc 203 corresponding to the first gesture input 201 between two elliptical arcs separate based on the long axis of the ellipse 202. The first decider 210 determines a relative position of the elliptical arc 203 to be up based on the long axis of the ellipse 202. In this example, a type of the elliptical arc 203 corresponding to the first gesture input 201 may be expressed as a tuple of (horizontal, up).

In another example, the first decider 210 predicts a trajectory of an ellipse 206 corresponding to a second gesture input 205 based on output information of a sensor about the second gesture input 205, and determines a direction of a long axis of the ellipse 206. The direction of the long axis of the ellipse 206 is determined to be a horizontal direction. Also, the first decider 210 determines an elliptical arc 207 corresponding to the second gesture input 205 between two elliptical arcs separate based on the long axis of the ellipse 206. The first decider 210 determines a relative position of the elliptical arc 207 to be down based on the long axis of the ellipse 206. In this example, a type of the elliptical arc 207 corresponding to the second gesture input 205 may be expressed as a tuple of (horizontal, down).

The second decider 220 determines a rotation direction corresponding to the gesture input. The second decider 220 determines whether the gesture input is a portion of a clockwise rotating motion input or a portion of a counterclockwise rotating motion input. In this example, the second decider 220 determines that the first gesture input 201 is a portion of the clockwise rotating motion input. In other words, a rotation direction corresponding to the first gesture input 201 is determined to be a clockwise direction 204. In another example, the second decider 220 determines that the second gesture input 205 is also a portion of the clockwise rotating motion input. In other words, a rotation direction corresponding to the second gesture input 205 is determined to be a clockwise direction 208.

The processor 230 processes the gesture input based on the type of the elliptical arc and the rotation direction. For example, the processor 230 may determine an input direction corresponding to the gesture input based on the type of the elliptical arc and the rotation direction. For example, the processor 230 may determine an input direction corresponding to the first gesture input 201 as a right direction based on (horizontal, up) and a clockwise direction. The processor 230 may perform an action corresponding to the right direction. For example, the processor 230 may perform a swipe right action.

In another example, the processor 230 may determine whether the gesture input corresponds to an intention delivery portion or a return portion of the circular motion input based on the type of the elliptical arc and the rotation direction. For example, in an elliptical circular motion input that rotates clockwise and has a long axis in a horizontal direction, an upper elliptical arc based on the long axis may correspond to the intention delivery portion, and a lower elliptical arc based on the long axis may correspond to the return portion. In this example, the processor 230 may determine that the first gesture input 201 corresponds to the intention delivery portion, and may determine that the second gesture input 205 corresponds to the return portion.

In this example, the processor 230 may perform an action corresponding to the circular motion input in response to the first gesture input 201 determined to correspond to the intention delivery portion. For example, the processor 230 may perform a swipe right action. The processor 230 may perform no action in response to the second gesture input 205 determined to correspond to the return portion.

FIGS. 3 and 4 illustrate types of an elliptical arc determined in response to a variety of gesture inputs and rotation directions according to exemplary embodiments. Referring to FIG. 3, when a direction of a long axis of an ellipse is a horizontal direction, a relative position of an elliptical arc based on the long axis may be determined as one of up and down, and a rotation direction of a gesture input may be determined as one of a clockwise direction and a counterclockwise direction. Referring to FIG. 4, when a direction of a long axis of an ellipse is a vertical direction, a relative position of an elliptical arc based on the long axis may be determined as one of left and right, and a rotation direction of a gesture input may be determined as one of a clockwise direction and a counterclockwise direction.

The first decider 210 of FIG. 1 may match a gesture input to one of candidate ellipses. The candidate ellipses may be distinguished from one another based on a direction of a long axis and a rotation direction. For example, in FIGS. 3 and 4, the candidate ellipses include a first candidate ellipse of (horizontal, clockwise), a second candidate ellipse of (horizontal, counterclockwise), a third candidate ellipse of (vertical, clockwise), and a fourth candidate ellipse of (vertical, counterclockwise). The first decider 210 may match the gesture input to one of the four candidate ellipses.

Each of the candidate ellipses may include a plurality of candidate elliptical arcs. For example, in FIGS. 3 and 4, each candidate ellipse includes two candidate elliptical arcs mutually separate based on a long axis. The first decider 210 may match the gesture input to one of the candidate elliptical arcs included in the matched candidate ellipse.

FIG. 5 illustrates actions corresponding to a variety of gesture inputs and performing the actions according to exemplary embodiments. Referring to FIG. 5, a correspondence action and performing of the action is determined based on a rotation direction and a type of an elliptical arc of a gesture input. For example, if the gesture input has a type of an elliptical arc 501 that is (horizontal, up), and a rotation direction that is clockwise, the correspondence action is a swipe right action, and the performing of the action is affirmative. In contrast, if the gesture input has a type of an elliptical arc 502 that is (horizontal, down), and the rotation direction that is clockwise, the correspondence action is a swipe right action, and the performing of the action is negative. When the performing of the action is negative, the correspondence action is not used. Accordingly, when the performing of the action is negative, the correspondence action is not set. The correspondence action based on the type of the elliptical arc of FIG. 5 and the performing of the action are only an example, and thus, the correspondence action and the performing of the action according to the type of the elliptical arc may be variously modified.

The performing of the action may be determined based on whether the type of the elliptical arc corresponds to an intention delivery portion or a return portion. For example, in an ellipse that rotates clockwise and that has a long axis in a horizontal direction, an upper elliptical arc (e.g., the elliptical arc 501) may be determined to correspond to the intention delivery portion, and a lower elliptical arc (e.g., the elliptical arc 502) may be determined to correspond to the return portion.

Settings as to whether a type of a predetermined elliptical arc corresponds to the intention delivery portion or the return portion may be modified based on a variety of criteria. For example, in a swipe up action and a swipe down action, a setting for a left-handed user and a setting for a right-handed user may be opposite to each other.

Settings as to whether the type of the predetermined elliptical arc corresponds to the intention delivery portion or the return portion may be ergonomically set. For example, in the case of a swipe left action, the user may move a hand counterclockwise at the same time of moving the hand in a horizontally long elliptical shape in order to iteratively turn pages to increase the number of pages. In this instance, a finger, a palm, and a wrist joint may naturally move similar to a page turning motion. In consideration of a natural movement of a joint for the page turning motion, the swipe left action may be set to be performed in response to recognizing a gesture input that has a type of an elliptical arc 503 that is (horizontal, up), and a rotation direction that is counterclockwise.

Figure 6:
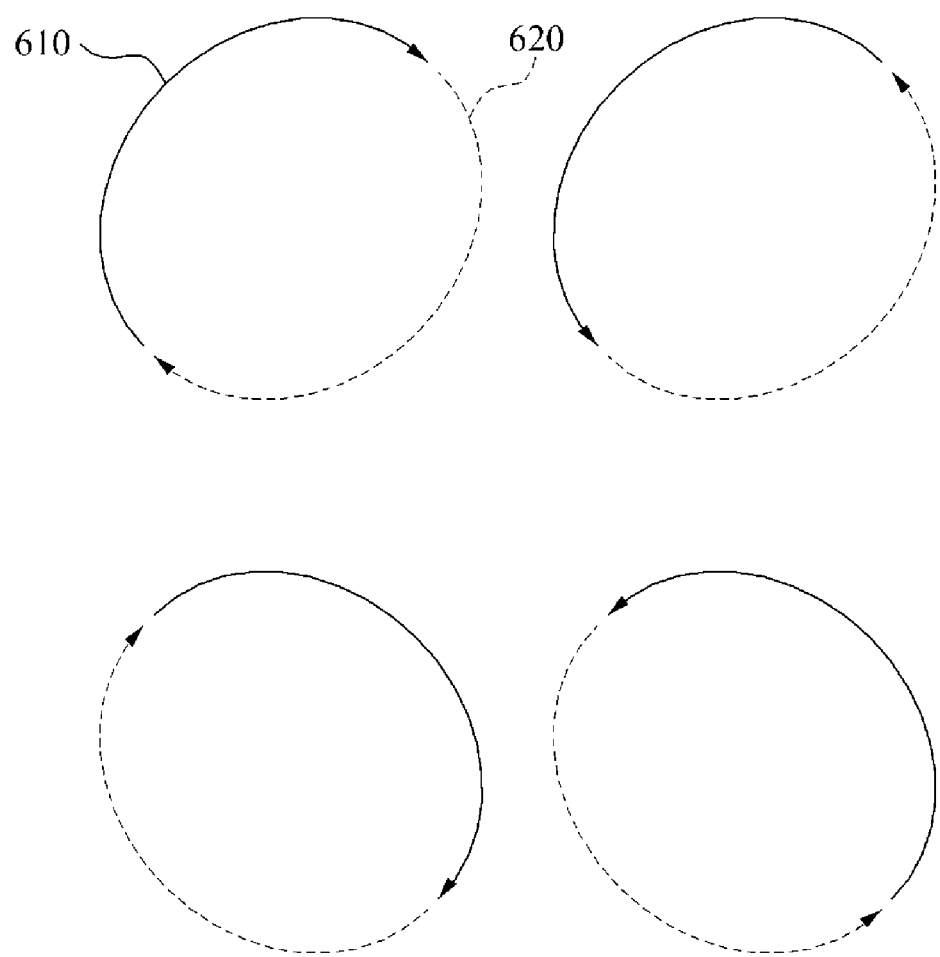
FIG. 6 illustrates circular motion inputs provided in an elliptical shape having a long axis in a diagonal direction according to exemplary embodiments.

FIG. 6 illustrates examples of circular motion inputs provided in an elliptical shape having a long axis in a diagonal direction according to exemplary embodiments. Referring to FIG. 6, in addition to circular motion inputs having a long axis in a horizontal direction or a vertical direction, the circular motion inputs having a long axis in a diagonal direction may be utilized. As described above with reference to FIG. 5, a correspondence action and performing of the action may be determined based on a type of an elliptical arc and a rotation direction. For example, in the case of an elliptical arc 610, a swipe right-up action may be determined to be performed. In the case of an elliptical arc 620, no action may be determined to be performed. The correspondence action and the performing of the action according to the type of the elliptical arc may be variously modified.

Figure 7:
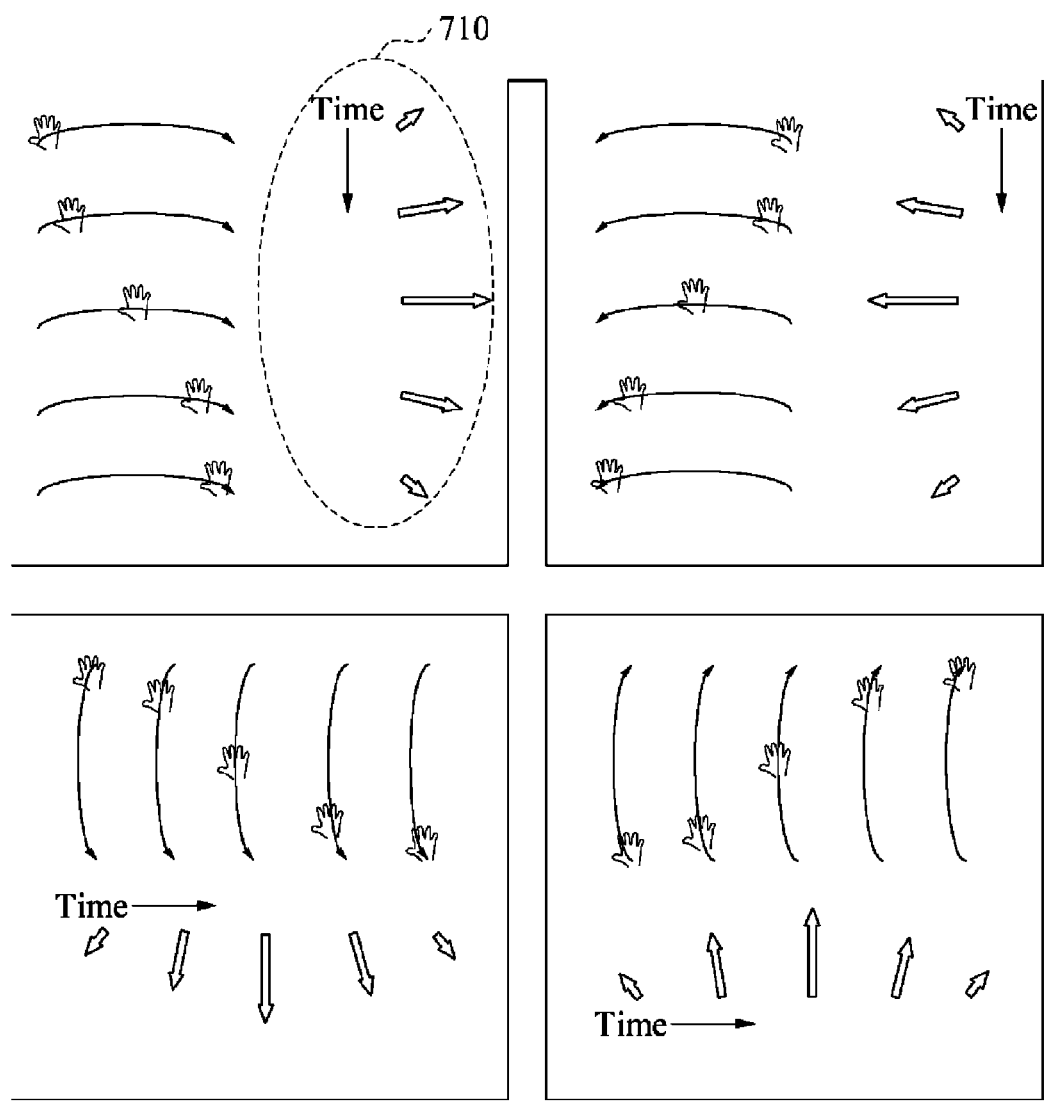
FIG. 7 illustrates determining a type of an elliptical arc and a rotation direction based on a change in a motion vector over time according to exemplary embodiments.

FIG. 7 illustrates determining a type of an elliptical arc and a rotation direction based on a change in a motion vector over time according to exemplary embodiments. Referring to FIG. 7, a motion vector may be calculated from a gesture input. The motion vector indicates a direction and a magnitude of a movement corresponding to the gesture input. A method of calculating the motion vector from the gesture input will be described below.

A gesture input processing apparatus may calculate motion vectors over time using a gesture input over time. The gesture input processing apparatus may divide the gesture input into a plurality of segments based on a predetermined criterion, and may calculate a motion vector of each segment. The predetermined criterion may be variously set based on a time, a movement distance of an input object, and an amount of an event triggered by a movement of the input object.

The gesture input processing apparatus may determine a type of an elliptical arc and a rotation direction corresponding to the gesture input, based on a change in motion vectors over time. For example, when motion vectors show a first change aspect 710 over time, the gesture input processing apparatus may determine that the gesture input corresponds to {(horizontal, up), clockwise}. Similarly, the gesture input processing apparatus may determine the type of the elliptical arc and the rotation direction corresponding to the gesture input.

Alternatively, the gesture input processing apparatus may track a change in positions, for example, position information over time based on a change in motion vectors over time. For example, when initial position information is known, the gesture input processing apparatus may calculate subsequent position information using motion vectors. Depending on examples, the initial position information may be set as a preset initial value. The gesture input processing apparatus may determine the type of the elliptical arc and the rotation direction corresponding to the gesture input based on the change in the position information over time.

Figure 8:
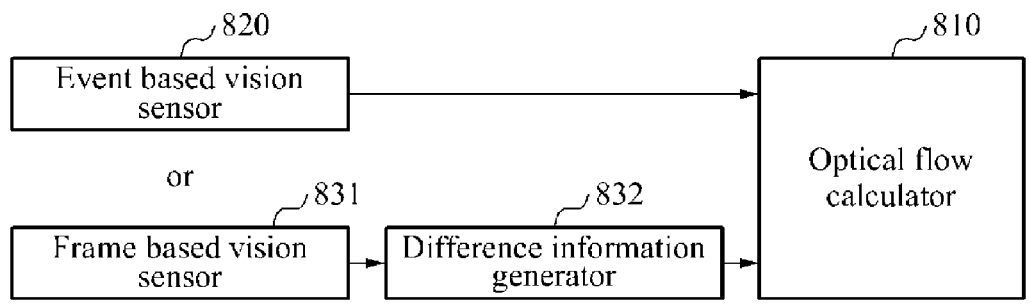
FIGS. 8 through 10 are diagrams illustrating a method of calculating a motion vector from a gesture input according to an exemplary embodiment.
Figure 9:
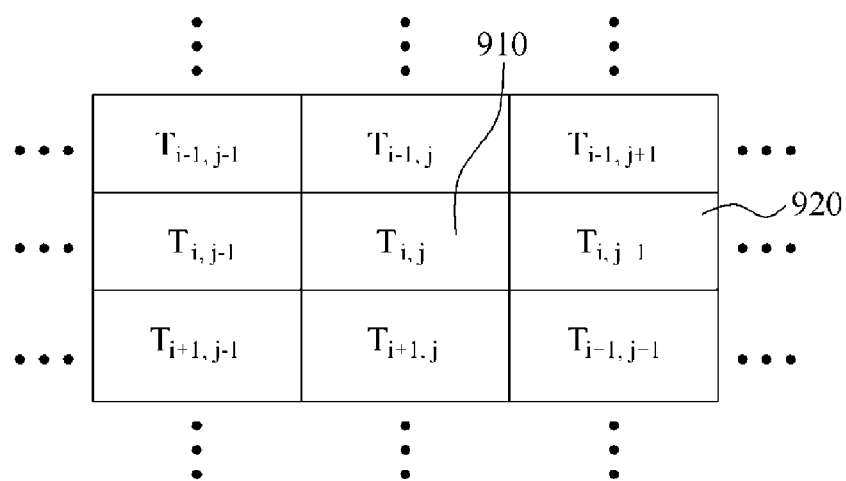
Figure 10:
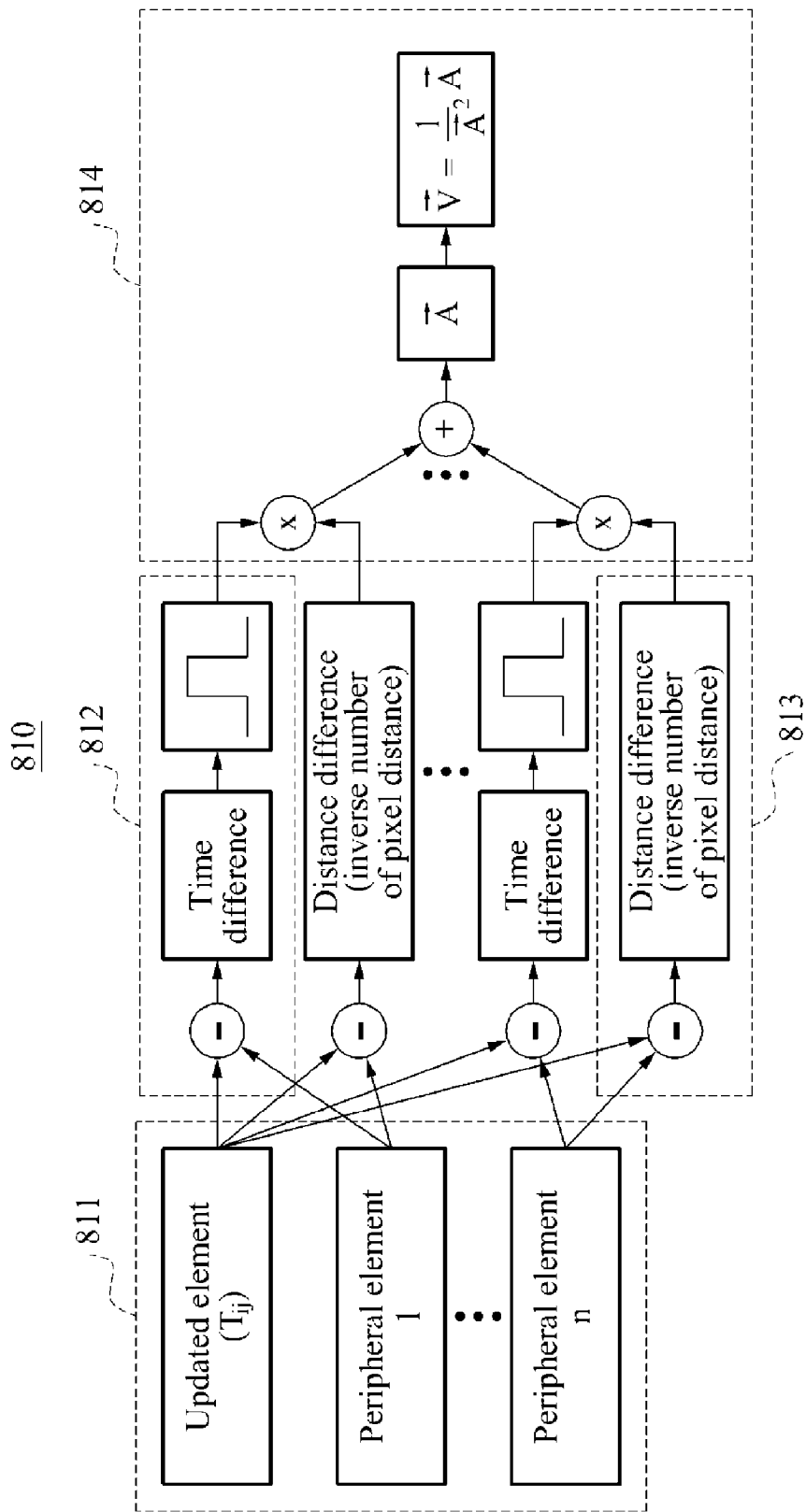

FIGS. 8 through 10 are diagrams illustrating a method of calculating a motion vector from a gesture input according to an exemplary embodiment. Referring to FIG. 8, an optical flow calculator 810 calculates an optical flow. The optical flow is a set of velocity vectors including information associated with a movement of brightness. A brightness of each pixel varies in response to moving an object with respect to a camera, and the optical flow may include such movement of brightness in a form of a two-dimensional (2D) vector. Although a change in brightness may be a terminology used in a visible light area, the change in brightness may be understood as a concept that includes both a change in brightness by visible light and a change in brightness by infrared (IR) light. For example, it may be understood that a brightness of IR light becomes bright according to an increase in a number of photons having a wavelength of an IR area. Further, it may be understood that a brightness of IR light becomes dark according to a decrease in the number of photons having a wavelength of an IR area.

The optical flow calculator 810 calculates the optical flow based on event signals corresponding to a movement of an input object. For example, the optical flow calculator 810 may receive event signals output from an event based vision sensor 820 to calculate the optical flow. The event based vision sensor 820 is a sensor that outputs an event signal time-asynchronously in response to detecting a predetermined event. The event based vision sensor 820 may include a plurality of event generation elements. Each of the event generation elements may detect a predetermined event, and may output an event signal. The event generation elements may be referred to as pixels of the event based vision sensor 820.

The predetermined event may include an event that intensity of light incident to the event based vision sensor 820 varies or an event that brightness varies. In response to detecting an event that light becomes bright in a predetermined pixel, the event based vision sensor 820 may output an ON event corresponding to the pixel. Also, in response to detecting an event that light becomes dark in a predetermined pixel, the event based vision sensor 820 may output an OFF event corresponding to the pixel.

In this example, the change in the intensity of light incident to the event based vision sensor 820 or the change in brightness may occur due to a movement of an object. For example, when a light source is fixed and an object does not autonomously emit light, light incident to the event based vision sensor 820 may be light that is generated from the light source and reflected from the object. When the object does not move, light reflected from the object in a stationary state does not substantially vary, and thus, the intensity of light incident to the event based vision sensor 820 or the brightness does not vary. In contrast, when the object moves, light reflected from the moving object varies according to a movement of the object, and thus, the intensity of light incident to the event based vision sensor 820 or the brightness may vary.

Accordingly, an event signal may not be generated with respect to a stationary object, and may be generated in response to detecting a moving object. The event based vision sensor 820 may output only pixel data of a portion in which light has changed, instead of scanning an output of a photodiode of each pixel based on a frame unit, which differs from a frame based vision sensor 831. For example, only a portion of event generation elements having detected a movement of the input object among the plurality of event generation events included in the event based vision sensor 820 may output an event signal.

In another example, the optical flow calculator 810 may utilize the frame based vision sensor 831 and a difference information generator 832 to calculate the optical flow. The frame based vision sensor 831, as a sensor that captures a gesture input for each frame, may include, for example, a charge coupled device (CCD) camera and a complementary metal oxide semiconductor (CMOS) camera. The difference information generator 832 may generate difference information between images by comparing images output from the frame based vision sensor 831. The difference information generated by the difference information generator 832 may correspond to an event signal output from the event based vision sensor 820. For example, the difference information generator 832 may detect pixels from which an inter-frame movement is detected by comparing images, and may output event signals corresponding to the detected pixels.

Referring to FIG. 9, the optical flow calculator 810 may utilize an event map 900 to calculate the optical flow. The event map 900 includes elements corresponding to pixels of the event based vision sensor 820 or pixels of the frame based vision sensor 831. Each element stores a most recent time at which an event signal corresponding to the element is received. For example, a most recent time at which an event signal is received in an element 910 at a position (i, j) is $T_{i,j}$, and a most recent time at which an event signal is received in an element 920 at a position (i, j+1) is $T_{i,j+1}$. Hereinafter, a time at which an event signal is received is referred to as a timestamp.

When an event signal is received, the optical flow calculator 810 may update the event map 900 in response to the received event signal. For example, the optical flow calculator 810 may detect an element corresponding to the received event signal from a plurality of elements included in the event map 900, and may update a value stored in the detected element with a timestamp at which the event signal is received.

The optical flow calculator 810 may store, for each element, a time at which a new event signal is received based on a unit of micro second (μs) or less. In this instance, the optical flow calculator 810 may calculate the optical flow without using history of event signals received over time and by using only a timestamp of an event signal received last. Accordingly, the optical flow calculator 810 may calculate the optical flow using a small memory and a small calculation amount.

Referring to FIG. 10, the optical flow calculator 810 includes a peripheral element decider 811, a time difference calculator 812, a distance difference calculator 813, and an optical flow calculation performer 814. Each of the peripheral element decider 811, the time difference calculator 812, the distance difference calculator 813, and the optical flow calculation performer 814 may be configured as a processor, a memory, a hardware accelerator (HWA), a field programmable gate array (FPGA), or a combination thereof.

The peripheral element decider 811 determines a plurality of peripheral elements based on an element of which a timestamp is updated in response to an event signal received. For example, the peripheral element decider 811 may determine, as the peripheral elements, eight elements directly adjacent to the element of which the timestamp is updated from the event map 900. The peripheral element decider 811 may also determine, as the peripheral elements, 16 elements surrounding the eight elements adjacent to the element of which the timestamp is updated, as well as the eight elements.

The time difference calculator 812 calculates a time difference between the element of which the timestamp is updated and the peripheral elements thereof using the event map 900. For example, when a new event signal is received and a timestamp of the element 910 is updated, the time difference calculator 812 may calculate a difference between a time $T_{i,j}$ stored in the element 910 and a time $T_{i,j+1}$ stored in the element 920 corresponding to a peripheral element. In this example, the time $T_{i,j}$ stored in the element 910 may be newly updated, and thus, $T_{i,j}-T_{i,j+1} \geq 0$. If an event concurrently occurs in the element 920, $T_{i,j}-T_{i,j+1}$ may become 0. The time difference calculator 812 may calculate the aforementioned time difference with respect to each of the peripheral elements determined by the peripheral element decider 811. Further, when the calculated time difference is outside a predetermined window range, for example, 0.1 second, the time difference calculator 812 may regard the time difference as insignificant information, and may output "0" instead of outputting the calculated time difference.

The distance difference calculator 813 calculates distance differences between the element of which the timestamp is updated and peripheral elements thereof. In detail, the distance difference calculator 813 may calculate an inverse number of an element distance between the element of which the timestamp is newly updated and each of the peripheral elements. Here, the element distance may include a normalized distance between a plurality of image elements. For example, an element distance between the elements 910 and 920 of FIG. 9 may be 1. The distance difference calculator 813 may calculate an inverse number of an element distance with respect to each of the peripheral elements determined by the peripheral element decider 811.

The optical flow calculation performer 814 calculates the optical flow based on the time difference calculated by the time difference calculator 812 and the distance difference calculated by the distance difference calculator 813. In detail, the optical flow calculation performer 814 calculates a two-dimensional (2D) vector A corresponding to the element of which the time stamp is updated based on the time difference and the distance difference, and divides the 2D vector A by an inner product value of the 2D vector A.

For example, the optical flow calculation performer 814 multiplies a time difference corresponding to each of the peripheral elements of the element of which the timestamp is updated by an inverse number of a distance difference. The optical flow calculation performer 814 calculates the 2D vector A by adding up multiplication results corresponding to the respective peripheral elements. The optical flow calculation performer 814 may calculate the 2D vector A according to Equation 1.

$$\vec{A} = \vec{d} \cdot \Delta t \frac{1}{\|\vec{d}\|^2} \qquad \text{[Equation 1]}$$

In Equation 1, Δ t denotes a time difference and a 2D vector d denotes a distance difference. A unit of the 2D vector A may be "time/distance". The optical flow calculation performer 814 calculates a velocity vector V included in the optical flow by dividing the 2D vector A by an inner product value of the 2D vector A. Here, a unit of the velocity vector may be "distance/time". The optical flow calculation performer 814 generates the optical flow including velocity vectors of elements by calculating the velocity vector V with respect to each element of which the timestamp is updated.

The optical flow calculator 810 may calculate a motion vector corresponding to a gesture input by calculating an average optical flow. The optical flow calculator 810 may calculate the average optical flow by calculating a vector summation of velocity vectors of elements. Since each of the velocity vectors of elements is a 2D vector, the average optical flow may also be a 2D vector.

The optical flow calculator 810 may remove an element that may act as noise from a velocity vector of each element included in the optical flow. As described above, when a time difference between an element of which a timestamp is updated and a peripheral element thereof is outside a predetermined window range, the time difference calculator 812 may output 0. When all of time differences between the element of which the timestamp is updated and peripheral elements thereof are outside the predetermined window range, the 2D vector A calculated by the optical flow calculation performer 814 may be "0". In this example, the optical flow calculation performer 814 may output "0" instead of outputting an infinite value calculated as the velocity vector V.

Referring to FIGS. 8 through 10, the optical flow may be calculated based on event signals generated by detecting the gesture input. The average optical flow corresponds to motion vectors of FIG. 7. The gesture input processing apparatus may determine a type of an input arc and a rotation direction based on a change in motion vectors over time.

Figure 11:
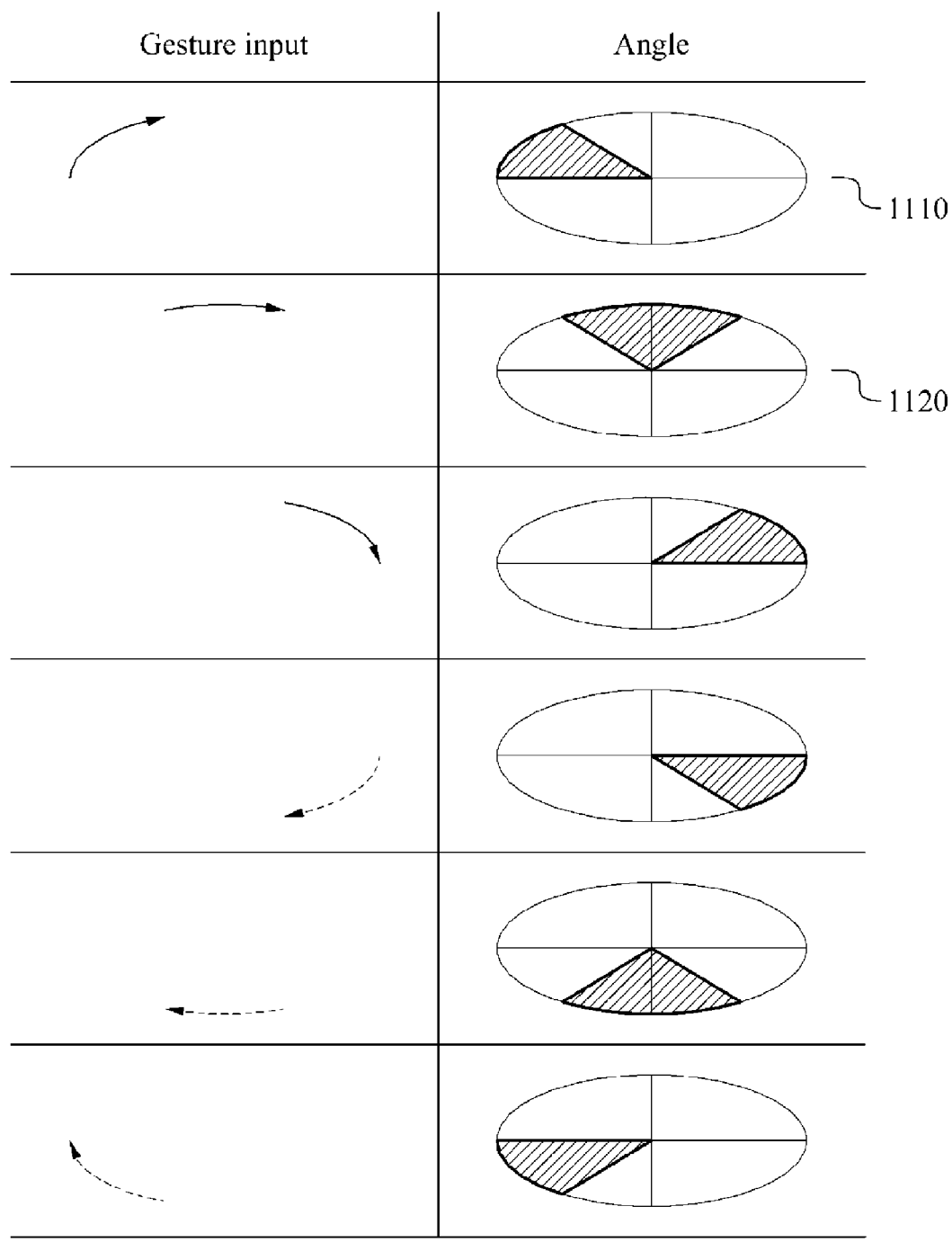
FIG. 11 illustrates types of an elliptical arc according to exemplary embodiments.

FIG. 11 illustrates types of an elliptical arc according to exemplary embodiments. Referring to FIG. 11, a detailed type of an elliptical arc may include an eccentricity of an ellipse corresponding to a gesture input and an angle indicating a position corresponding to the gesture input in a periphery of the ellipse. The gesture input processing apparatus may calculate the eccentricity and the angle based on a change in motion vectors over time.

In the case of using a detailed type of an elliptical arc, the gesture input processing apparatus may determine whether to perform an action corresponding to a current gesture input based on a previous angle indicating a position corresponding to a previous gesture input and a current angle indicating a position corresponding to the current gesture input.

For example, an angle corresponding to a gesture input detected at a first point in time may be a first angle 1110 and an angle corresponding to a gesture input detected at a second point in time that is a subsequent point in time of the first point in time may be a second angle 1120. When an action corresponding to the gesture input detected at the first point in time is performed in response to the gesture input determined to correspond to an intention delivery portion, an action corresponding to the gesture input detected at the second point in time may not be duplicately performed regardless of the gesture input at the second point in time still corresponding to the intention delivery portion.

Also, in the case of using a detailed type of an elliptical arc, the gesture input processing apparatus may control a phase of an action based on an angle indicating a position corresponding to a gesture input. For example, when an action corresponding to the gesture input is a swipe action, the gesture input processing apparatus may represent intermediate operations of swiping a screen or a page while tracking augmentation of angles corresponding to the intention delivery portion.

Further, the gesture input processing apparatus may process the gesture input based on a size of an ellipse corresponding to the gesture input and a velocity of the gesture input. For example, when the size of the ellipse corresponding to the gesture input is greater than or equal to a threshold size or when the velocity of the gesture input is greater than or equal to a threshold velocity, an action to be performed may vary. The size of the ellipse or the velocity of the gesture input calculated by the gesture input processing apparatus is affected by a distance between an input object and a sensor. Accordingly, the gesture input processing apparatus may further utilize a depth sensor a stereo sensor.

Figure 12:
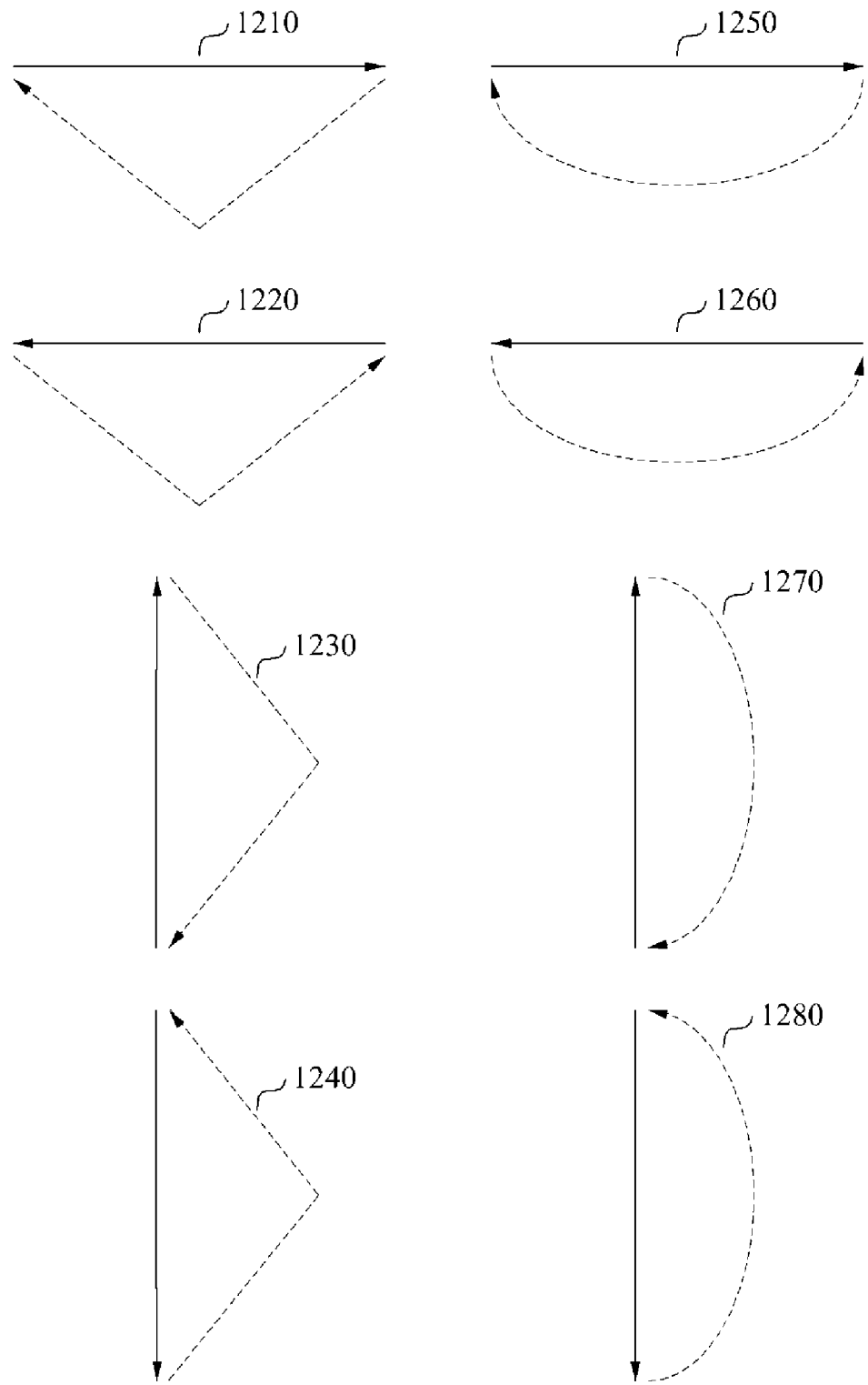
FIG. 12 illustrates types of a circular motion input according to exemplary embodiments.

FIG. 12 illustrates types of a circular motion input according to exemplary embodiments. Referring to FIG. 12, the circular motion input may be provided in various shapes in addition to an elliptical shape. A gesture input of a user may match one of the various shapes of the circular motion input.

The gesture input processing apparatus may select a candidate figure corresponding to the gesture input from candidate figures having a predetermined rotation direction and a predetermined trajectory, and may determine a part corresponding to the gesture input among parts included in the candidate figure. The gesture input processing apparatus may determine whether to perform an action matching the candidate figure based on the determined part.

For example, the circular motion input may be provided in a triangular shape 1210, 1220, 1230, or 1240 of which a base side is longest. In this example, a gesture input corresponding to the base side may be determined to correspond to an intention delivery portion, and a gesture input corresponding to the remaining two sides may be determined to correspond to a return portion. In another example, the circular motion input may be provided in a semi-elliptical shape 1250, 1260, 1270, or 1280 of which a long axis is a base side. In this example, a gesture input corresponding to the base side may be determined to correspond to the intention delivery portion, and a gesture input corresponding to the elliptical arc may be determined to correspond to the return portion.

Each of the candidate figures may match an action, for example, a swipe action, corresponding to a direction of a main axis of a candidate figure. For example, in each of the triangular shapes 1210, 1220, 1230, and 1240 of which the base side is longest and the semi-elliptical shapes 1250, 1260, 1270, and 1280 of which the long axis is the base side, a main axis may correspond to the base side.

Figure 13:
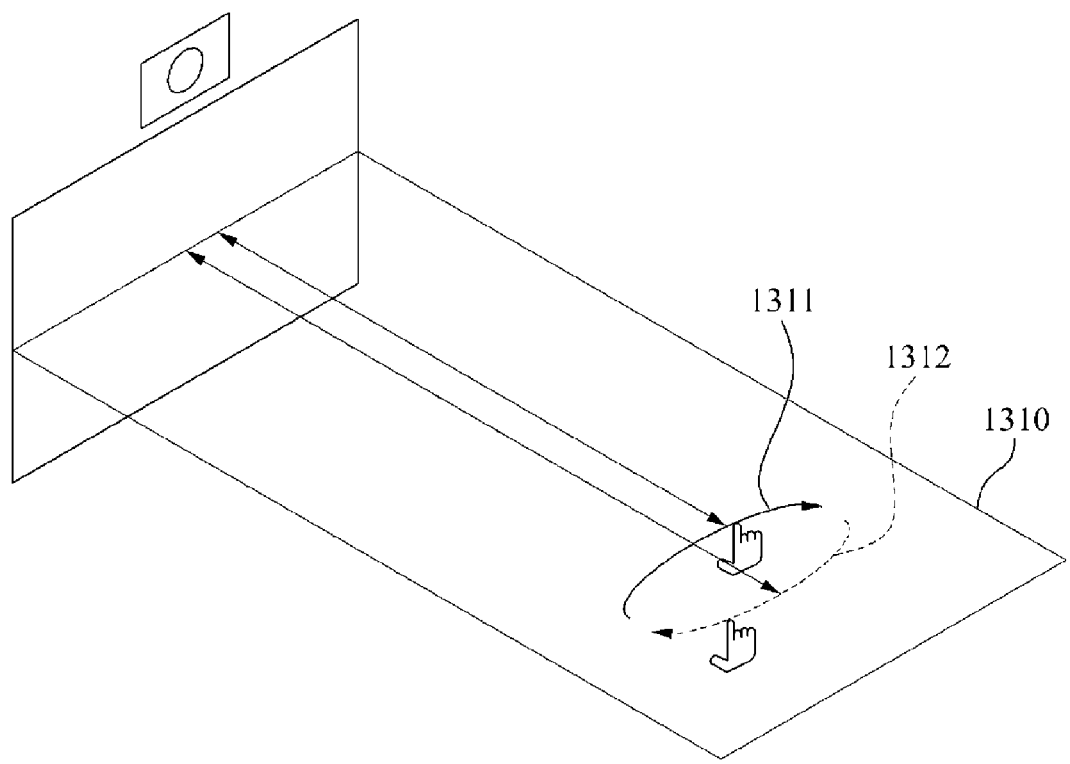
FIGS. 13 and 14 are views illustrating a method of processing a gesture input based on a depth of the gesture input according to exemplary embodiments.
Figure 14:
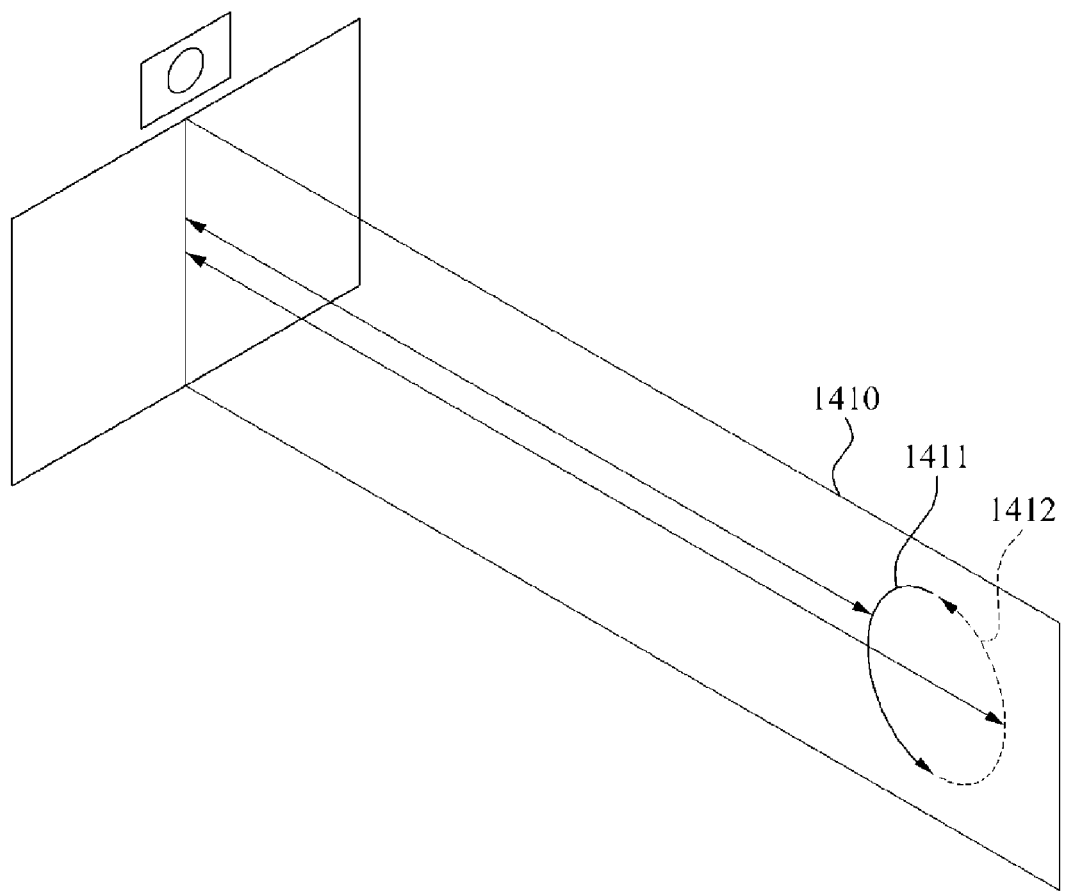

FIGS. 13 and 14 are views illustrating a method of processing a gesture input based on a depth of the gesture input according to exemplary embodiments. Referring to FIG. 13, a user moves an input object above a virtual plane 1310. In this instance, the user moves the input object while intending a left direction or a right direction.

The gesture input processing apparatus may determine a portion relatively close to a sensor as an intention delivery portion, and may determine a portion relatively distant from the sensor as a return portion, in a trajectory of a circular motion input. For example, in response to recognizing a gesture input corresponding to an elliptical arc 1311, the gesture input processing apparatus may perform an action corresponding to the right direction. In contrast, in response to recognizing a gesture input corresponding to an elliptical arc 1312, the gesture input processing apparatus may perform no action.

Referring to FIG. 14, a user moves an input object along a virtual plane 1410. In this instance, the user moves the input object while intending an upward direction or a downward direction.

The gesture input processing apparatus may determine a portion relatively close to a sensor as an intention delivery portion, and may determine a portion relatively distant from the sensor as a return portion, in a trajectory of a circular motion input. For example, in response to recognizing a gesture input corresponding to an elliptical arc 1411, the gesture input processing apparatus may perform an action corresponding to the downward direction. In contrast, in response to recognizing a gesture input corresponding to an elliptical arc 1412, the gesture input processing apparatus may perform no action.

Figure 15:
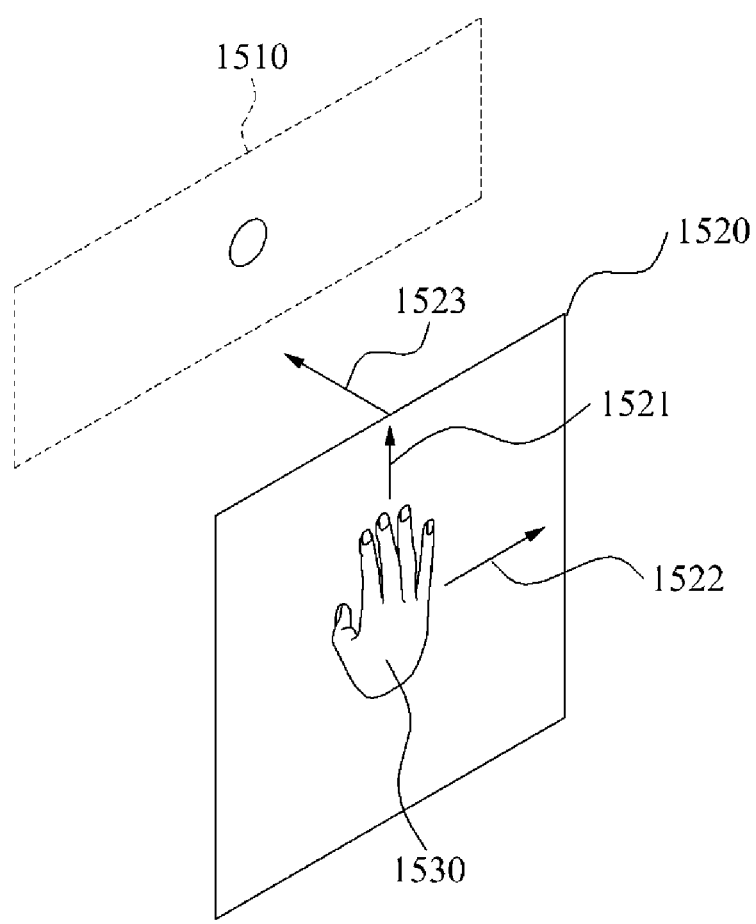
FIGS. 15 through 17 are views illustrating a method of calculating a z-axial motion vector using an optical flow according to an exemplary embodiment.
Figure 16:
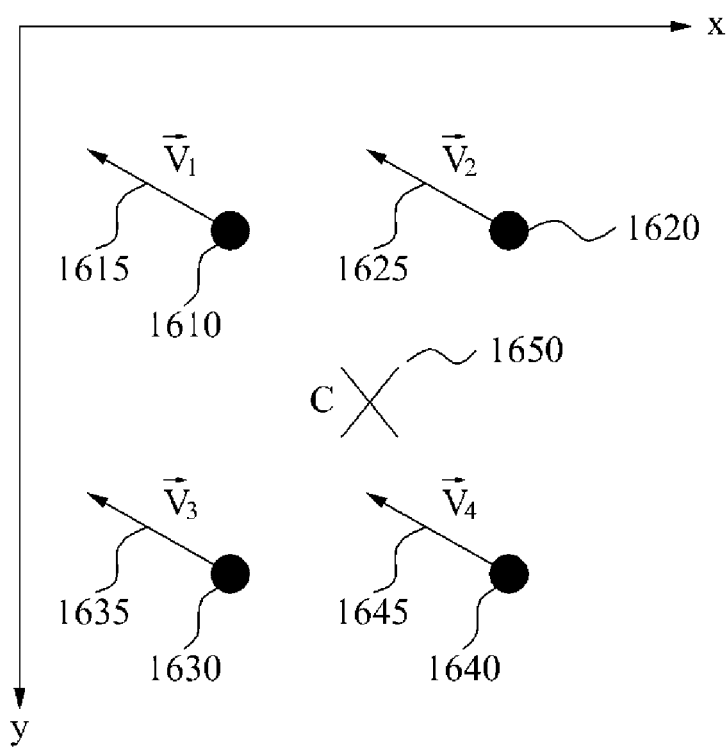
Figure 17:
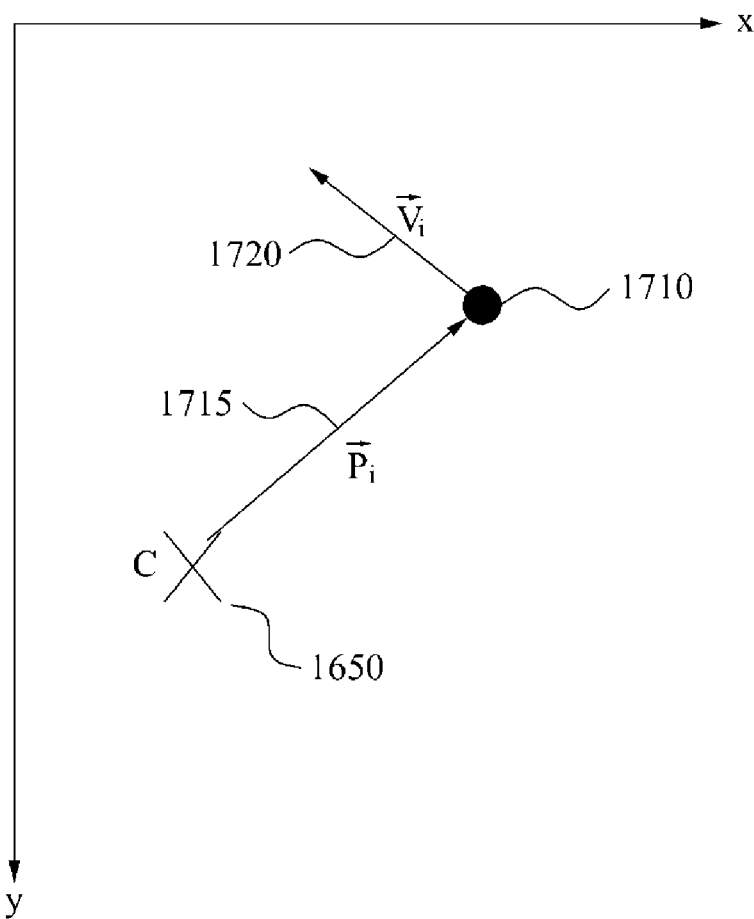

FIGS. 15 through 17 are views illustrating a method of calculating a z-axial motion vector using an optical flow according to an exemplary embodiment. Referring to FIG. 15, the gesture input processing apparatus calculates a z-axial motion vector Vz that moves in a direction 1523 vertical to a virtual plane 1520 that is in parallel with a sensor 1510, based on the optical flow. As described above with reference to FIGS. 8 through 10, the gesture input processing apparatus calculates an x-axial motion vector Vx that moves in an x-axial direction 1521 and a y-axial motion vector Vy that moves in a y-axial direction 1522 along the virtual plane 1520.

The gesture input processing apparatus may calculate a center of the optical flow to calculate the z-axial motion vector Vz. The gesture input processing apparatus may calculate the center of the optical flow by calculating a centroid of velocity vectors of elements included in the optical flow.

For example, referring to FIG. 16, when timestamps of elements 1610, 1620, 1630, and 1640 are updated, the optical flow includes a velocity vector $V_1$ 1615 corresponding to the element 1610, a velocity vector $V_2$ 1625 corresponding to the element 1620, a velocity vector $V_3$ 1635 corresponding to the element 1630, and a velocity vector $V_4$ 1645 corresponding to the element 1640. The gesture input processing apparatus may calculate a center c 1650 of the optical flow by substituting Equation 2 with a position (x-axial coordinate, y-axial coordinate) of each of the elements 1610, 1620, 1630, and 1640, and a magnitude (x-axial magnitude, y-axial magnitude) of each of the velocity vector $V_1$ 1615, the velocity vector $V_2$ 1625, the velocity vector $V_3$ 1635, and the velocity vector $V_4$ 1645.

$$c = \left( \frac{\sum_i |V_{xi}| x_i}{\sum_i |V_{xi}|}, \frac{\sum_i |V_{yi}| y_i}{\sum_i |V_{yi}|} \right) \qquad \text{[Equation 2]}$$

The gesture input processing apparatus may calculate the z-axial motion vector Vz based on the optical flow and the center of the optical flow. In detail, the gesture input processing apparatus may generate a relative position vector of an element based on a position of the element of which the timestamp is updated and the center of the optical flow.

Further, the gesture input processing apparatus may calculate the z-axial motion vector Vz by performing an inner product on a velocity vector and the relative position vector of the element.

For example, referring to FIG. 17, an i-th element among elements of which timestamps are updated is an element 1710. In this example, the gesture input processing apparatus generates a relative position vector 1715 based on a position of the center c 1650 and a position of the element 1710. Further, the gesture input processing apparatus may calculate a z-axial motion vector Vz by substituting Equation 3 with the relative position vector 1715 and a velocity vector 1720 of the i-th element.

$$V_z = \sum_i \vec{p}_i \cdot \vec{V}_i \qquad \text{[Equation 3]}$$

Referring to FIG. 15, when an input object 1530 is moving to be close to the sensor 1510, the z-axial motion vector Vz calculated by the gesture input processing apparatus may have a positive (+) value. On the contrary, when the input object 1530 is moving to be distant from the sensor 150, the z-axial motion vector Vz may have a negative (−) value.

According to technical matters made above with reference to FIGS. 15 through 17, a z-axial motion vector may be further calculated in addition to an x-axial motion vector and a y-axial motion vector. The gesture input processing apparatus may determine a type of an input arc and a rotation direction based on a change in the x-axial motion vector, the y-axial motion vector, and the z-axial motion vector over time.

Figure 18:
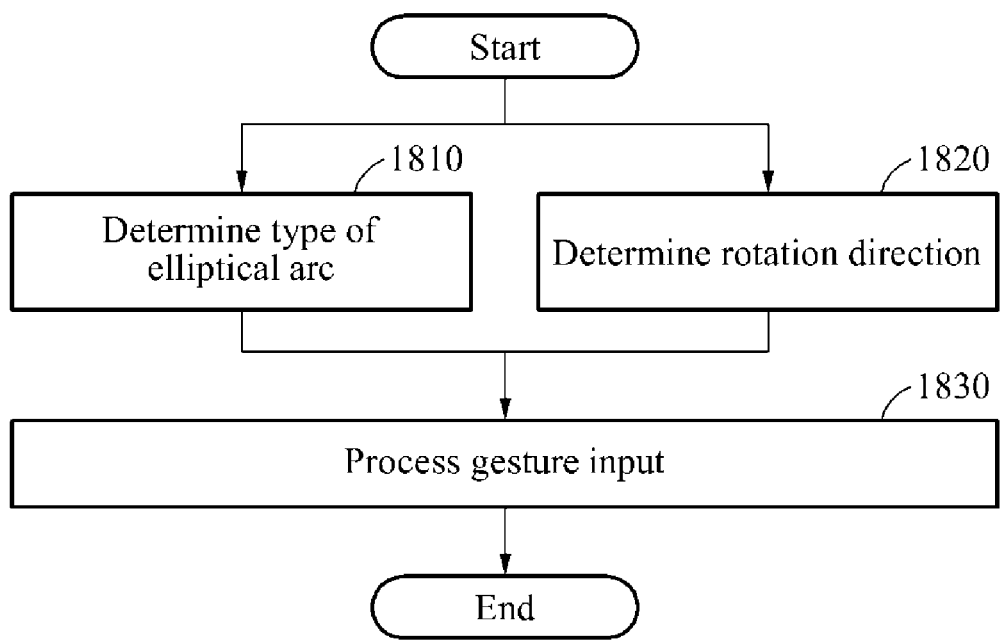
FIG. 18 is a flowchart illustrating a method of processing a gesture input according to an exemplary embodiment.

FIG. 18 is a flowchart illustrating a method of processing a gesture input according to an exemplary embodiment. Referring to FIG. 18, in operation 1810, the gesture input processing method includes determining a type of an elliptical arc corresponding to a gesture input.

In operation 1820, the gesture input processing method includes determining a rotation direction corresponding to the gesture input.

In operation 1830, the gesture input processing method includes processing the gesture input based on the type of the elliptical arc and the rotation direction. Technical matters made above with reference to FIGS. 1 through 17 may be applicable to each of operations 1810, 1820, and 1830 of FIG. 18, and thus, a further description will be omitted here.

Figure 19:
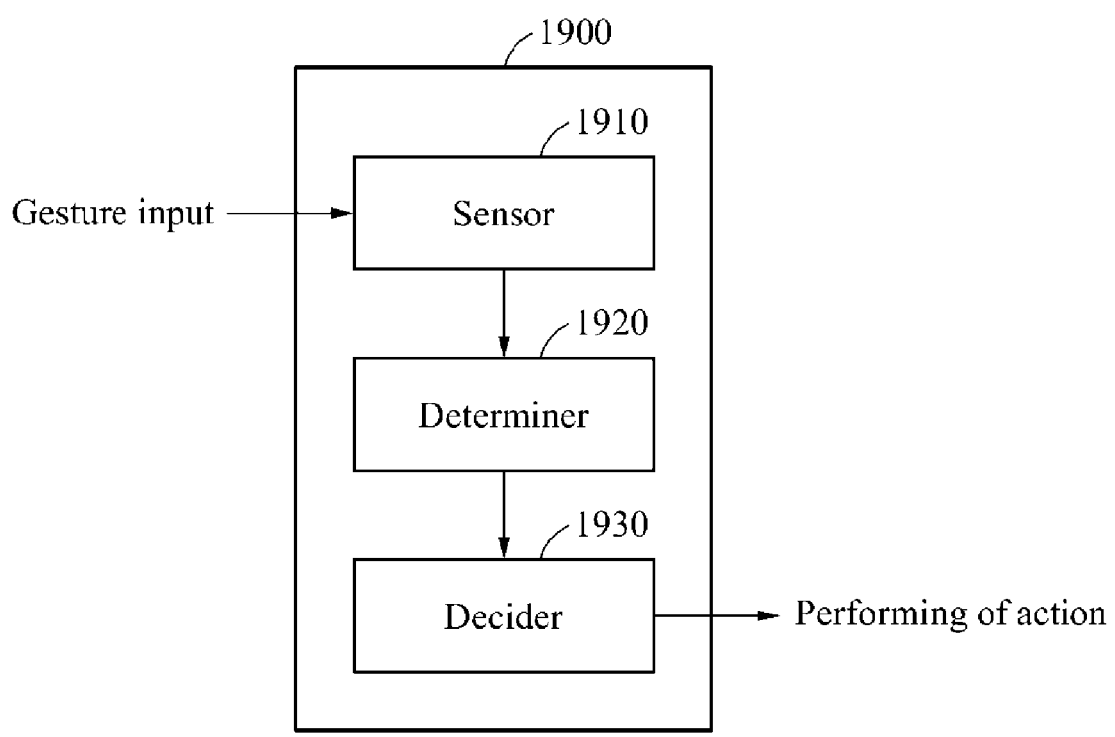
FIG. 19 is a block diagram illustrating a gesture input processing apparatus according to an exemplary embodiment.

FIG. 19 is a block diagram illustrating a gesture input processing apparatus according to an exemplary embodiment. Referring to FIG. 19, the gesture input processing apparatus 1900 includes a sensor 1910, a determiner 1920, and a decider 1930. The sensor 1910 detects a gesture input.

The determiner 1920 determines a candidate figure corresponding to the gesture input among candidate figures having a predetermined rotation direction and trajectory, and a part corresponding to the gesture input among parts included in the candidate figure.

The decider 1930 determines whether to perform an action that matches the candidate figure based on the determined part. Technical matters made above with reference to FIGS. 1 through 17 may be applicable to modules of FIG. 19, and thus, a further detailed description will be omitted.

The various modules, elements, and methods described above may be implemented using one or more hardware components, one or more software components, or a combination of one or more hardware components and one or more software components. A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art. Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing a current gesture input, the method comprising:
    determining whether a direction of a long axis of an ellipse corresponding to the current gesture input is horizontal or vertical;
    determining whether an elliptical arc position of an elliptical arc corresponding to the current gesture input is in a first position or a second position that is separated from the long axis;
    determining whether a rotation direction corresponding to the current gesture input is clockwise or counterclockwise;
    performing an action corresponding to the current gesture input in response to the determining that the direction of the long axis is vertical and the elliptical arc is in the first position; and
    suspending the action in response to the determining that the direction of the long axis is vertical and the elliptical arc is in the second position,
    wherein the action comprises a first action and a second action different from the first action, the first action being performed in response to the determining that the rotation direction is clockwise, and the second action being performed in response to the determining that the rotation direction is counterclockwise.

2. The method of claim 1, wherein the current gesture input is a portion of an iterative elliptical motion input.

3. The method of claim 1, wherein the current gesture input is corresponding to one of an intention delivery portion and a return portion of a circular motion input.

4. The method of claim 1, further comprising:
receiving a plurality of event signals from pixels of an event based vision sensor that detects a change in light due to the current gesture input,
wherein any one or any combination of the direction of the long axis, the elliptical arc position of the elliptical arc, and the rotation direction is determined based on the plurality of event signals.

5. The method of claim 4, further comprising:
determining an optical flow, based on distance differences and time differences between first elements of an event map that correspond to the plurality of event signals and peripheral elements of the first elements,
wherein any one or any combination of the direction of the long axis, the elliptical arc position of the elliptical arc, and the rotation direction is determined based on the optical flow.

6. The method of claim 1, further comprising:
receiving a plurality of images from a frame based vision sensor that captures the current gesture input for each frame; and
comparing the plurality of images to generate difference information between the plurality of images,
wherein any one or any combination of the direction of the long axis, the elliptical arc position of the elliptical arc, and the rotation direction is determined based on the difference information.

7. The method of claim 1, further comprising:
matching the current gesture input to the ellipse among ellipses; and
matching the current gesture input to the elliptical arc among arcs of the ellipse.

8. The method of claim 7, wherein the arcs are mutually separate based on the long axis of the ellipse.

9. The method of claim 1, further comprising:
determining an eccentricity of the ellipse; and
determining an angle indicating a current gesture input position corresponding to the current gesture input in a periphery of the ellipse.

10. The method of claim 1, further comprising:
determining either one or both of a first change in motion vectors over time and a second change in position information over time that correspond to the current gesture input,
wherein any one or any combination of the direction of the long axis, the elliptical arc position of the elliptical arc, and the rotation direction is determined based on either one or both of the first change in the motion vectors over time and the second change in the position information over time.

11. The method of claim 1, further comprising:
determining an input direction corresponding to the current gesture input, based on the direction of the long axis, the elliptical arc position of the elliptical arc, and the rotation direction,
wherein the action corresponding to the input direction is performed.

12. The method of claim 1, further comprising:
determining whether the current gesture input is corresponding to one of an intention delivery portion and a return portion of a circular motion input, based on the direction of the long axis, the elliptical arc position of the elliptical arc, and the rotation direction,
wherein the performing comprises performing the action corresponding to the circular motion input in response to the determining that the current gesture input is corresponding to the intention delivery portion, and the suspending comprises suspending the action in response to the determining that the current gesture input is corresponding to the return portion.

13. The method of claim 1, further comprising:
determining whether to perform the action, based on a first angle indicating a previous gesture input position corresponding to a previous gesture input and a second angle indicating a current gesture input position corresponding to the current gesture input in a periphery of the ellipse corresponding to the previous gesture input and the current gesture input.

14. The method of claim 1, further comprising:
controlling a phase of the action, based on an angle indicating a current gesture input position corresponding to the current gesture input in a periphery of the ellipse.

15. The method of claim 1, further comprising:
determining whether the current gesture input is corresponding to the ellipse; and
discarding the current gesture input in response to the determining that the current gesture input does not correspond to the ellipse.

16. The method of claim 1, wherein the current gesture input is input on a virtual plane in parallel with a vision sensor that detects the current gesture input.

17. The method of claim 1, further comprising:
processing the current gesture input, based on any one or any combination of a size of the ellipse, a velocity of the current gesture input, and a depth of the current gesture input.

18. A non-transitory computer-readable storage medium storing a program comprising instructions to cause a computer to implement the method of claim 1.

19. An apparatus for processing a current gesture input, the apparatus comprising:
a sensor configured to detect the current gesture input;
a processor configured to:
determine whether a direction of a long axis of an ellipse corresponding to the current gesture input is horizontal or vertical;
determine whether an elliptical arc position of an elliptical arc corresponding to the current gesture input is in a first position or a second position that is separated from the long axis; and
determine whether a rotation direction corresponding to the current gesture input is clockwise or counterclockwise; and
a decider configured to decide to:
perform an action corresponding to the current gesture input in response to the direction of the long axis being determined to be vertical and the elliptical arc being determined to be in the first position; and
suspend the action in response to the direction of the long axis being determined to be vertical and the elliptical arc being determined to be in the second position,
wherein the action comprises a first action and a second action different from the first action, the first action being performed in response to the rotation direction being determined to be clockwise, and the second action being performed in response to the rotation direction being determined to be counterclockwise.

20. The apparatus of claim 19, wherein the current gesture input comprises a swipe action in the direction of the long axis.

21. The apparatus of claim 19, wherein the sensor comprises:

an event based vision sensor configured to detect a change in light due to the current gesture input; and a frame based vision sensor configured to capture the current gesture input for each frame.

22. An apparatus for processing a current gesture input, the apparatus comprising:

a sensor configured to detect the current gesture input;

a processor configured to:
   determine whether a direction of a long axis of an ellipse corresponding to the current gesture input is horizontal or vertical;
   determine whether an elliptical arc position of an elliptical arc corresponding to the current gesture input is above, below, left of, or right of the long axis; and
   determine whether a rotation direction corresponding to the current gesture input is clockwise or counter-clockwise; and a decider configured to decide to:
   perform a first action in response to the direction of the long axis being determined to be vertical, the elliptical arc position of the elliptical arc being determined to be left of the long axis, and the rotation direction being determined to be clockwise;
   suspend the first action in response to the direction of the long axis being determined to be vertical, the elliptical arc position of the elliptical arc being determined to be right of the long axis, and the rotation direction being determined to be clockwise;
   perform a second action in response to the direction of the long axis being determined to be vertical, the elliptical arc position of the elliptical arc being determined to be left of the long axis, and the rotation direction being determined to be counter-clockwise; and
   suspend the second action in response to the direction of the long axis being determined to be vertical, the elliptical arc position of the elliptical arc being determined to be right of the long axis, and the rotation direction being determined to be counter-clockwise.

23. The apparatus of claim 22, wherein the processor is further configured:
   determine a change in an x-axial motion vector, a y-axial motion vector, and a z-axial motion vector over time that correspond to the current gesture input,
   wherein any one or any combination of the direction of the long axis, the elliptical arc position of the elliptical arc, and the rotation direction is determined based on the change in the x-axial motion vector, the y-axial motion vector, and the z-axial motion vector over time.

* * * * *